(12) United States Patent
Bartlett

(10) Patent No.: US 7,425,013 B1
(45) Date of Patent: Sep. 16, 2008

(54) CONTINUOUSLY ADJUSTABLE HITCH ASSEMBLY

(76) Inventor: Jerrold R. Bartlett, 3717 14th St.C, Lewiston, ID (US) 83501

( * ) Notice: Subject to any disclaimer, the term of this patent is extended or adjusted under 35 U.S.C. 154(b) by 416 days.

(21) Appl. No.: 11/358,424

(22) Filed: Feb. 22, 2006

(51) Int. Cl.
*B60D 1/00* (2006.01)

(52) U.S. Cl. .................................... 280/479.3

(58) Field of Classification Search ............... 280/463, 280/468, 477–479.3, 511
See application file for complete search history.

(56) References Cited

U.S. PATENT DOCUMENTS

| | | |
|---|---|---|
| 3,400,949 A | 9/1968 | Kendall |
| 4,033,601 A | 7/1977 | Lindahl et al. |
| 4,103,928 A | 8/1978 | Sheppard, Jr. |
| 4,266,799 A | 5/1981 | Wood |
| 5,358,269 A | 10/1994 | Jakeman et al. |
| 6,126,189 A | 10/2000 | Venis |
| 6,575,488 B2 | 6/2003 | Massey |
| 6,663,133 B1 | 12/2003 | Rosenlund |
| 6,824,156 B2 | 11/2004 | Smith |
| 7,111,417 B1 * | 9/2006 | Bartlett ...................... 37/231 |
| 2004/0061308 A1 * | 4/2004 | McCarron et al. ........ 280/478.1 |

* cited by examiner

*Primary Examiner*—John Q. Nguyen
*Assistant Examiner*—Jacob Knutson
(74) *Attorney, Agent, or Firm*—Norman Rainer

(57) ABSTRACT

A ball hitch device mountable upon the rear of a tractor vehicle is interactive with a ball-receiving socket disposed upon a forwardly directed tongue of a trailered apparatus. The ball hitch device includes paired rigid extension arms pivotably secured to the tractor vehicle and which embrace a tubular receiver into which a hitch bar is telescopically inserted. A hitch ball extends upwardly from the rearward extremity of the hitch bar. An electrically driven winch has a lifting cable attached to the receiver. When activated, the cable causes the assembly of extension arms, receiver and hitch bar to pivot upwardly in a circular arc, thereby controllably raising the hitch ball toward engagement with the ball-receiving socket.

5 Claims, 2 Drawing Sheets

CONTINUOUSLY ADJUSTABLE HITCH ASSEMBLY

BACKGROUND OF THE INVENTION

1. Field of the Invention

The present invention generally relates to trailer hitches of the type commonly used to connect a tractor vehicle to a trailered apparatus and, more particularly, to a hitch assembly which permits continuous adjustment of the elevation of the site of coupling of a hitch ball with an interactive socket mechanism.

2. Description of the Prior Art

Trailer hitches are devices that connect a tractor vehicle (also called a tow vehicle) to a trailer vehicle by means of a ball hitch which is mounted onto the vehicle, or mounted onto a tow bar which is connected to the vehicle. The hitch ball then mates with a socket located on the trailer tongue. This ball and socket configuration is designed to allow adequate rotation of the socket with respect to the ball so that the vehicle-trailer combination can maneuver around corners. Typically the socket mechanism has a releasably lockable coupling so that it locks onto the ball hitch to prevent decoupling while towing.

A common problem with hitches is that the ball and interactive socket of the tractor and trailered members are generally not at the same elevation to permit proper coupling. Accordingly, hitches have been disclosed having means for adjusting the elevation of the ball to accommodate the socket. Such modified hitches are described in U.S. Pat. Nos. 3,554,578; 4,103,928 and 6,663,133 which employ rotatable screw drive means to move the hitch ball in a straight vertical path. Said adjustable hitches are effective in the coupling of a tractor vehicle to an ordinary towed vehicle wherein the elevation of the ball must remain fixed in the course of the towing operation.

U.S. patent application Ser. No. 11/122,904, filed May 6, 2005 by J. R. Bartlett describes a trailered earth-moving apparatus adapted to be drawn by a small vehicle such as an all-terrain vehicle (ATV). The functioning of the earth-moving apparatus in digging, dumping and grading operations is controlled in part by the elevational positioning of the tongue of the trailered apparatus, said action causing tilting of the apparatus and consequent adjustable interaction with the underlying earth. In order to be effective, the tilting of the apparatus must be controlled in a continuous manner during forward motion of the coupled ATV and earth-moving apparatus. Other kinds of trailered working equipment such as a rake, rototiller, plow, aerator, cultivator, disc harrow, weed cutter and seeder can also be controlled by tilting effect. Such necessary tilting control is not achievable with adjustable hitch mechanisms of the prior art.

It is accordingly an object of the present invention to provide a hitch device for a trailered apparatus, said hitch device capable of providing continuous vertical adjustment during movement of said apparatus.

It is a further object of this invention to provide a hitch device as in the foregoing object amenable to easy coupling between a tractor vehicle and said trailered apparatus.

It is another object of the present invention to provide a hitch device of the aforesaid nature which, by virtue of said vertical adjustment, causes controlled tilting of said trailered apparatus in a vertical plane.

It is a still further object of this invention to provide a hitch device of the aforesaid nature mountable upon said tractor vehicle.

These objects and other objects and advantages of the invention will be apparent from the following description.

SUMMARY OF THE INVENTION

The above and other beneficial objects and advantages are accomplished in accordance with the present invention by a ball hitch device mountable upon the rear of a tractor vehicle and interactive with ball-receiving socket means disposed upon a forwardly directed tongue of a trailered apparatus, said hitch device comprising:

a) mounting means attachable to a structurally rigid component of the rear of said tractor vehicle,
b) paired rigid extension arms disposed in spaced apart facing parallel relationship and extending between proximal extremities attached by pivot means to said mounting means and distal extremities directed rearwardly away from said tractor vehicle,
c) receiver means of rectangular tubular construction secured between said extension arms adjacent said distal extremities and having upwardly directed cable-securing means,
d) an elongated hitch bar telescopically interactive with said receiver means and extending to a rearward extremity,
e) a hitch ball extending upwardly from said hitch bar adjacent the rearward extremity thereof,
f) support means attached to said mounting means and extending rearwardly to an upper extremity,
g) an electric winch motor secured to the upper extremity of said support means and having a spindle centered above said extension arms, and
h) a lifting cable operatively wound upon said spindle and extending downwardly to engagement with said cable-securing means, whereby
i) activation of said winch motor causes said cable to be wound upon said spindle with attendant raising of said hitch ball in an arcuate path within a vertical plane centered between said extension arms, and said hitch ball is lowered within the same path by the unwinding of said cable from said spindle achieved by the gravity effect of the weight of said trailered apparatus acting through the tongue of said apparatus.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
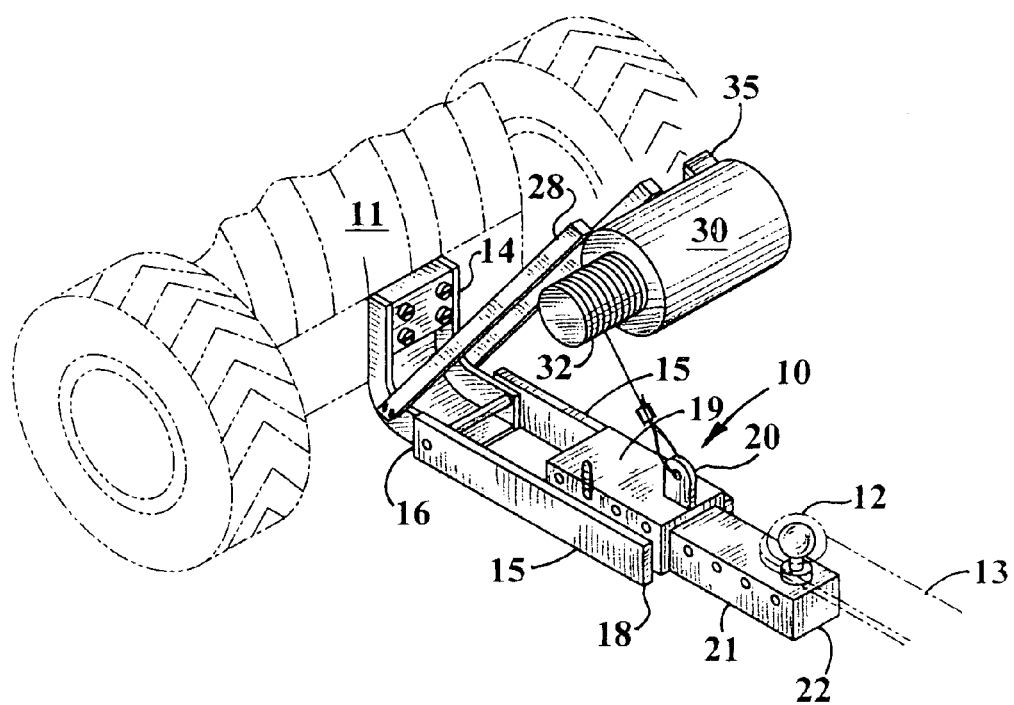
FIG. 1 is a top perspective view of an embodiment of the hitch assembly of this invention shown in association with an ATV towing vehicle, depicted in phantom outline, and the tongue of a towed apparatus, also shown in phantom outline.

Referring now to FIGS. 1-4, an embodiment of the hitch assembly 10 of the present invention is shown attached to the rear of an ATV vehicle 11 and forwardly engaging the coupling socket 12 positioned upon the forwardly directed tongue 13 of a towed apparatus of the nature described in the aforementioned U.S. patent application Ser. No. 11/122,904.

The hitch assembly is comprised of mounting means in the form of mounting plate 14 which is securely bolted to the rear bumper or chassis framework of the ATV. Paired rigid extension arms 15 are disposed in spaced apart facing parallel relationship and extend between proximal extremities 16 attached by pivot pin 17 to said mounting plate and distal extremities 18 directed rearwardly away from said ATV.

Receiver means 19, of rectangular tubular construction, is secured by welding between said extension arms adjacent said distal extremities thereof. An upwardly directed cable-securing fixture 20 is fixedly attached to said receiver means.

An elongated hitch bar 21 is telescopically interactive with said receiver means, and extends to a rearward extremity 22. The position of said hitch bar within receiver means 19 may be secured by way of a series of matching parallel bores 25 within the receiver means and hitch bar, and a lock pin 24 adapted to engage said properly aligned matching bores. A hitch ball 23 having an integral neck portion 26 and base collar 27, extends upwardly from said hitch bar adjacent rearward extremity 22.

Support means in the form of paired rigid support arms 28 are attached to mounting plate 14 and extend obliquely rearward to opposed upper extremities 29. An electric winch motor 30 is secured by bracket means 31 to the upper extremities 29 of said support arms. An electrical terminal box 35 on the motor receives conductor wires that supply electricity from the ATV. A spindle 32 extends laterally from motor 30 and is positioned above extension arms 15. A lifting cable 33 is operatively wound upon said spindle, and extends downwardly to engagement with cable-securing fixture 20.

In operation, when the driver of the ATV desires to tilt the trailered apparatus, he activates the winch motor. Such action causes said cable to be wound upon said spindle, thereby raising hitch ball 23 in an arcuate vertical path, as shown by the arrowed line in FIG. 2. Said path is dictated by pivoted movement of the assembled extension arms, receiver means and hitch bar about pivot pin 17. Upward movement of the ball forces the tongue of the trailered apparatus upwardly, thereby tilting the trailered apparatus in a manner and to a degree which achieves specific functionality of the apparatus. In order that the movement of the ball is reasonably elevational relative to the rearward component of its travel in a circular arc, it is critical that its radius of travel, namely the distance between pivot pin 17 and ball 25 be between 12 and 18 inches.

Figure 2:
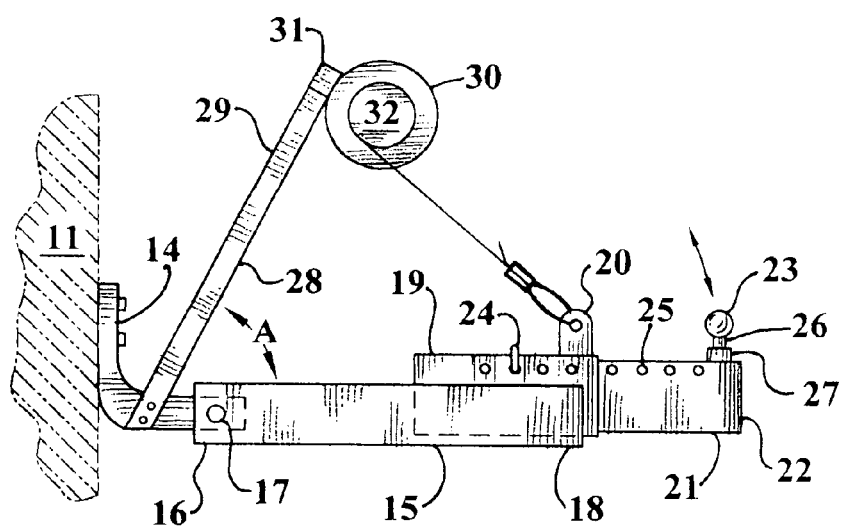
FIG. 2 is a side view thereof.
Figure 3:
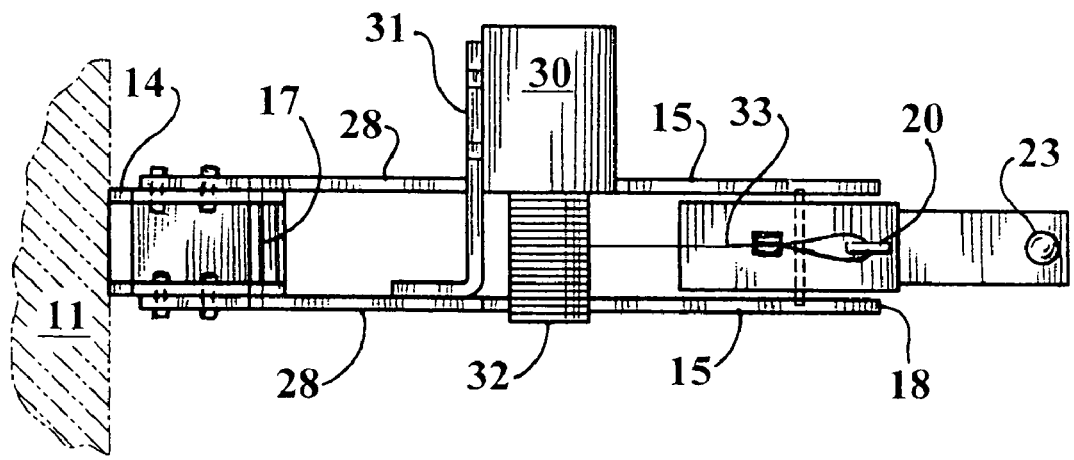
FIG. 3 is a top view thereof.
Figure 4:
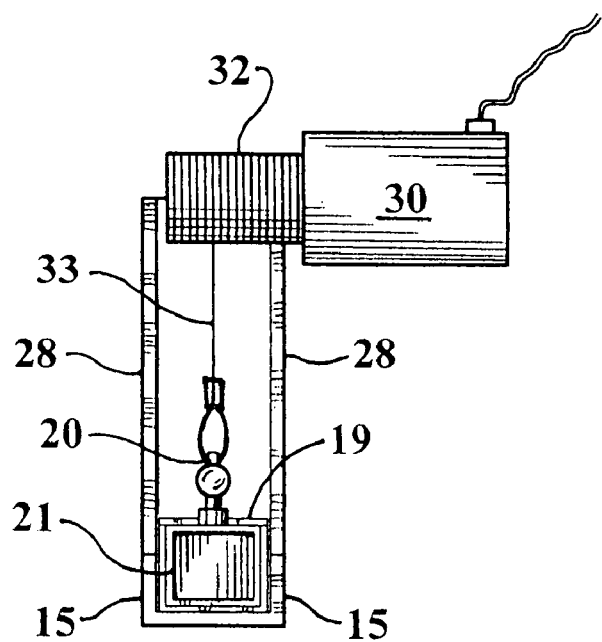
FIG. 4 is an end view taken from the right of FIG. 2.

The location of the winch and associated spindle relative to the underlying pivoted components is a critical feature. As shown in FIG. 2, the angular relationship, shown as angle A, of the support arms above the horizontally located extension arms should be in the range of 45 and 65 degrees.

The hitch ball and associated components are lowered when the spindle is caused to travel in the reverse direction, as may be produced by the effect of the weight of the towed apparatus acting upon the socket means on the tongue of the trailer.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A ball hitch device mountable upon the rear of a tractor vehicle and interactive with ball-receiving socket means disposed upon a forwardly directed tongue of a trailered apparatus, said hitch device comprising:
   a) mounting means attachable to a structurally rigid component of the rear of said tractor vehicle,
   b) paired rigid extension arms disposed in spaced apart facing parallel relationship and extending between proximal extremities attached by pivoting means to said mounting means and distal extremities directed rearwardly away from said tractor vehicle,
   c) receiving means of rectangular tubular construction secured between said extension arms adjacent said distal extremities and having upwardly directed cable-securing means,
   d) an elongated hitch bar telescopically received within said received means and extending to a rearward extremity,
   e) a hitch ball extending upwardly from said hitch bar adjacent said rearward extremity thereof,
   f) supporting means attached to said mounting means and extending rearwardly to an upper extremity,
   g) an electric winch motor secured to said upper extremity of said supporting means and having a horizontally oriented spindle centered above said extension arms, and
   h) a lifting cable operatively wound upon said spindle and extending downwardly to engagement with said cable-securing means, whereby
   i) activation of said winch motor causes said cable to be wound upon said spindle with attendant raising of said hitch ball in an arcuate path within a vertical plane centered between said extension arms, and said hitch ball is lowered within the same path by the unwinding of said cable from said spindle achieved by the gravity effect of the weight of said trailered apparatus acting through the tongue of said apparatus.

2. The ball hitch device of claim 1 wherein said tractor vehicle is an all terrain vehicle (ATV).

3. The ball hitch device of claim 1 wherein the position of said hitch bar within said receiving means is secured by way of a series of matching parallel bores within said receiving means and said hitch bar, and a lock pin adapted to engage said properly aligned matching bores.

4. The ball hitch device of claim 1 wherein the distance between said pivoting means and said hitch ball is between 12 and 18 inches.

5. The ball hitch device of claim 4 wherein said rearwardly extending supporting means are angularly disposed to said paired extension arms, the size of said angle being between 45 and 65 degrees.

* * * * *